UNITED STATES PATENT OFFICE.

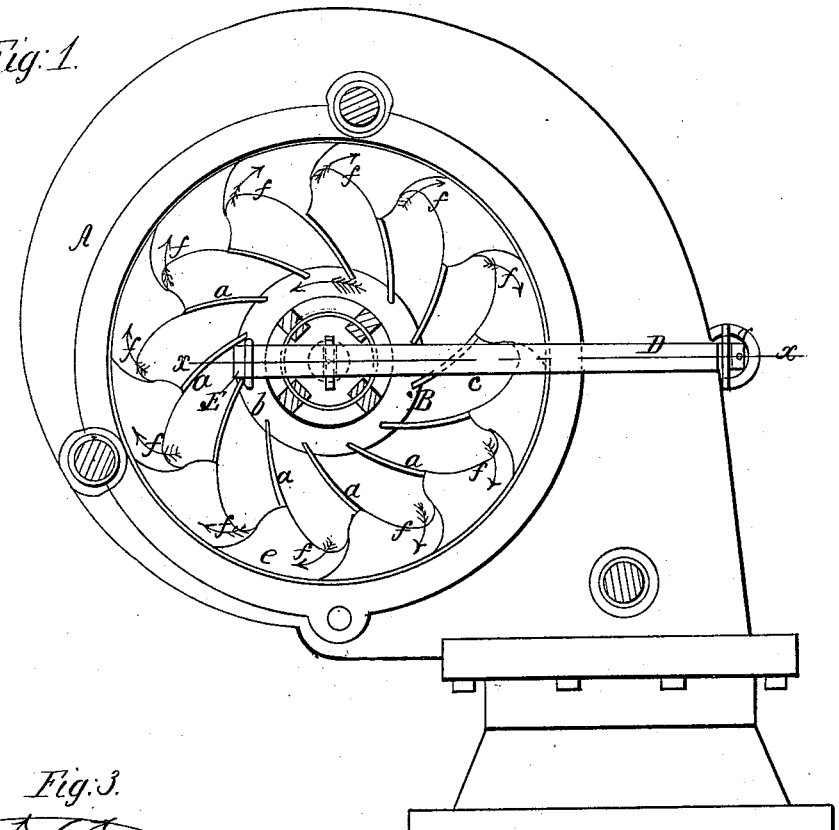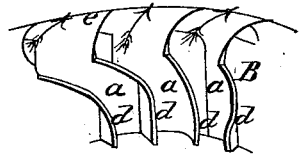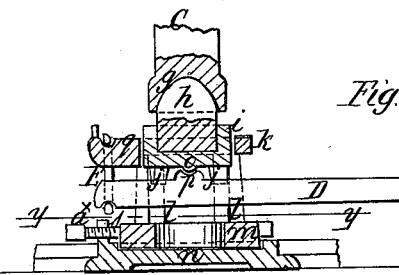

JOHN TYLER, OF WEST LEBANON, NEW HAMPSHIRE.

IMPROVEMENT IN WATER-WHEELS.

Specification forming part of Letters Patent No. 44,240, dated September 13, 1864.

*To all whom it may concern:*

Be it known that I, JOHN TYLER, of West Lebanon, in the county of Grafton and State of New Hampshire, have invented a new and Improved Water-Wheel; and I do hereby declare that the following is a full, clear, and exact description thereof, which will enable any person skilled in the art to make and use the same, reference being had to the accompanying drawings, making a part of this specification, in which—

Figure 1 is an inverted plan or bottom view of my invention, the step of the wheel-shaft being in section, as indicated by the line $y'\ y'$, Fig. 2; Fig. 2, a vertical central section of the wheel-shaft, $x\ x$, Fig. 1, indicating the line of section; Fig. 3, a detached perspective view of a portion of the wheel inverted, showing several of its buckets.

Similar letters of reference indicate like parts.

This invention relates to certain improvements in horizontal water-wheels; and it consists in an improvement in the shape or form of the buckets, as hereinafter fully shown and described, whereby the water is allowed to leave the wheel in a direction tangentially therewith, and without having the buckets descend or project below the lower rim of the wheel, so as to cause or produce any drawback when working in a submerged state.

The invention further consists in a novel and improved construction of the step of the wheel-shaft, whereby the bearing may be raised and lowered with but little friction and the shaft kept in line with the greatest facility.

This invention may be considered as an improvement on a water-wheel patented by me May 22, 1855, July 8, 1856, and June 1, 1858; but the improvements are also applicable to other wheels of the same class.

A represent a scroll, in which the wheel B is placed. This wheel is provided with curved buckets $a$, which extend from its periphery to a pendent head or hub $b$, at the under side of the top plate, $c$, of the wheel, the spaces between the buckets gradually decreasing in width from their outer to their inner ends, so that the issues will be considerably narrower than any other part of the spaces between the buckets, as shown in Fig. 1. The inner ends of the buckets are rounded, as shown at $d$, in Fig. 3, and the lower rim, $e$, of the wheel has a depression, $f$, at the discharge side of each bucket, which admits of the escape of the water in a lateral or tangential direction from the wheel, as indicated by the arrows in Figs. 1 and 3. By means of these depressions the water is allowed to escape in the direction specified without extending the lower parts of the front portions of the buckets below the rim $e$. This latter plan, although it would accomplish the same end, would create a serious difficulty, for the buckets would serve as a great drawback when working in a submerged state, so much so as to counteract all the benefit obtained by the lateral or tangential discharge of the water. By my improvement the rim $e$ does not offer any resistance to the tail-water, at least not any more than a plane surface, while the advantage obtained by the lateral or tangential discharge of the water from the wheel is very considerable, as the water naturally takes that direction, and when resisted or turned in a different course by the form of the buckets it has not a free discharge, and hence a loss of power is the result.

C is the shaft of the wheel, the lower end of which has a semi-spherical cavity, $g$, made in it, which rests on a semi-spherical bearing, $h$, fitted in a socket, $i$. This bearing may be of Babbitt metal or other suitable material, and the socket $i$ is of cylindrical form and provided with a series of pendants, $j$, which serve as guides. This socket $i$ is fitted within a ring, $k$, at the upper ends of the uprights $l$, which are on a circular bed, $m$, the latter being placed on the center of the base $n$, which supports the scroll. The uprights $l$ are concave at their inner sides, corresponding to the curvature of the exterior of the socket, and the pendants $j$ bear against the inner surfaces of the uprights $l$. At the under side of the socket $i$ there is a lip or projection, $o$, to fit into a recess, $p$, in a lever, D, the fulcrum of the latter being in a link, E, which is suspended on an arm, $q$, projecting horizontally from the ring $k$. The outer end of this lever D is fitted in an eye, $r$, at the lower end of a vertical rod, F, having a screw cut on its upper part, on which a nut works. By this arrangement it will be seen that the bearing $h$ may be raised whenever necessary to compensate for wear, the socket $i$ being raised by a vertical pressure underneath it, and consequently without any friction being produced by lateral pressure. The shaft C may always be kept in line by adjusting screws $a^x$, which pass through lugs $s$ on the base $n$, and bear against the circular bed $m$.

I do not claim the form or position of the buckets $a$, for they have been previously used; but,

Having thus described my invention, I claim as new and desire to secure by Letters Patent—

Having the lower rim, $e$, of the wheel provided with depressions $f$ at the discharge sides of the buckets $a$, for the purpose of admitting of the lateral or tangential discharge of the water from the wheel, so arranged that no portion of the buckets extend below said rim, substantially as described.

JOHN TYLER.

Witnesses:
    EPHRAIN KINSMAN,
    DANIEL RICHARDSON.